United States Patent
Ahn

(10) Patent No.: US 7,415,281 B2
(45) Date of Patent: Aug. 19, 2008

(54) CELL BROADCASTING SERVICE SYSTEM AND METHOD

(75) Inventor: Kye Hyuk Ahn, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 10/188,135

(22) Filed: Jul. 3, 2002

(65) Prior Publication Data

US 2003/0013466 A1    Jan. 16, 2003

(30) Foreign Application Priority Data

Jul. 6, 2001    (KR)    ................. 2001-40417

(51) Int. Cl.
*H04Q 7/20*    (2006.01)
(52) U.S. Cl. ............... 455/466; 455/566; 455/458; 340/7.1; 340/7.43
(58) Field of Classification Search ............... 455/455, 455/466, 458, 412.1, 517–518, 502–503, 455/426.1, 566; 340/7.1, 7.2, 7.27, 7.43
See application file for complete search history.

(56) References Cited

U.S. PATENT DOCUMENTS

| | | | | |
|---|---|---|---|---|
| 4,866,431 A | * | 9/1989 | Andros et al. | 340/825.02 |
| 5,479,472 A | * | 12/1995 | Campana et al. | 455/412.1 |
| 5,878,033 A | * | 3/1999 | Mouly | 370/312 |
| 5,878,351 A | * | 3/1999 | Alanara et al. | 455/466 |
| 5,909,651 A | * | 6/1999 | Chander et al. | 455/466 |
| 5,920,822 A | * | 7/1999 | Houde et al. | 455/466 |
| 5,920,826 A | * | 7/1999 | Metso et al. | 455/557 |
| 5,966,663 A | * | 10/1999 | Gleason | 455/466 |
| 5,977,880 A | * | 11/1999 | Aoki | 340/7.23 |
| 6,055,413 A | * | 4/2000 | Morse et al. | 340/7.43 |
| 6,091,961 A | * | 7/2000 | Khalil | 455/466 |
| 6,097,949 A | * | 8/2000 | Jung et al. | 455/466 |
| 6,119,014 A | * | 9/2000 | Alperovich et al. | 455/466 |
| 6,125,281 A | * | 9/2000 | Wells et al. | 455/466 |
| 6,175,743 B1 | * | 1/2001 | Alperovich et al. | 455/466 |
| 6,201,974 B1 | * | 3/2001 | Lietsalmi et al. | 455/466 |
| 6,289,223 B1 | * | 9/2001 | Mukherjee et al. | 455/466 |
| 6,370,391 B1 | * | 4/2002 | Lietsalmi et al. | 455/466 |
| 6,405,035 B1 | * | 6/2002 | Singh | 455/414.1 |
| 6,470,181 B1 | * | 10/2002 | Maxwell | 455/466 |
| 6,522,877 B1 | * | 2/2003 | Lietsalmi et al. | 455/422.1 |

(Continued)

FOREIGN PATENT DOCUMENTS

CN    126242 A    9/2000

*Primary Examiner*—Sharad Rampuria
(74) *Attorney, Agent, or Firm*—Fleshner & Kim, LLP

(57) ABSTRACT

A cell broadcasting service system includes: a terminal for generating a short message service (SMS) type message and a cell broadcasting service (CBS) type message; an SMS center for transmitting a CBS type message to a CB center when receiving the CBS type message from the terminal; and a CB center for broadcasting a received message to a corresponding range area by referring to broadcast range information of the message when receiving the message from the SMS center. By assigning a CB ID to a specific subscriber group (a small circles or a local group), a general subscriber can broadcast a short message in the position of the CB entity. In addition, various get-together information and local information can be easily provided to subscribers of a group located within a broadcast range, and more efficient and substantial information can be provided at a low cost.

21 Claims, 6 Drawing Sheets

U.S. PATENT DOCUMENTS

| | | | |
|---|---|---|---|
| 6,526,027 B1 * | 2/2003 | Yeom | 455/466 |
| 6,584,323 B1 * | 6/2003 | Son | 455/466 |
| 6,625,460 B1 * | 9/2003 | Patil | 455/466 |
| 6,671,513 B1 * | 12/2003 | Frank et al. | 455/456.1 |
| 6,721,574 B1 * | 4/2004 | Jang | 455/466 |
| 6,768,895 B2 * | 7/2004 | Lahtinen | 455/2.01 |
| 6,801,793 B1 * | 10/2004 | Aarnio et al. | 455/566 |
| 6,826,408 B1 * | 11/2004 | Kim et al. | 455/466 |
| 6,862,461 B2 * | 3/2005 | Gawne | 455/557 |
| 6,920,331 B1 * | 7/2005 | Sim et al. | 455/466 |
| 7,096,044 B2 * | 8/2006 | Gil et al. | 455/566 |
| 2002/0034956 A1 * | 3/2002 | Mekuria | 455/466 |
| 2002/0123361 A1 * | 9/2002 | Bae | 455/517 |
| 2002/0177428 A1 * | 11/2002 | Menard et al. | 455/404 |
| 2003/0013439 A1 * | 1/2003 | Daniel et al. | 455/422 |
| 2003/0186694 A1 * | 10/2003 | Sayers et al. | 455/426.1 |

* cited by examiner

CELL BROADCASTING SERVICE SYSTEM AND METHOD

BACKGROUND OF THE INVENTION

1. Field of the Invention

The present invention relates to a message service of a mobile communication, and more particularly, to a cell broadcasting service system and method.

2. Description of the Background Art

An SMS, an abbreviate for short message services, refers to a service for transmitting a data with a comparatively short length (usually from 80 byte to 160 byte) in a mobile communication network.

The SMS has been set up as the mobile communication network is developed to a digital method and a digital data is transmitted among inside the mobile communication network, a base station and a terminal. For the SMS, a terminal of a subscriber should have software supporting the SMS.

According to a transmission method, the SMS includes a point-to-point (p-t-p) type and a point-to-multipoint (broadcasting) type, based on which many SMS-related supplementary services are being developed.

As noted from what we call the two types, the point-to-point type is an SMS center to terminal type. More specifically, it signifies that a final destination is one terminal.

Meanwhile, in case of the broadcasting type, a final destination is every terminal, not a specific one terminal, if it can receive a message.

Especially, a minimum unit of the broadcasting in the CDMA network is a base station (cell), so that it is called 'cell broadcasting'.

Another difference between the two types lies in a reliability in a data transmission. The point-to-point type can make a reliable data transmission. That is, a message center takes the responsibility of completely performing the transmission. However, in case of the cell broadcasting, if a user's terminal is in an OFF state or the line is busy, the user would fail to receive a corresponding message.

FIG. 1 is a drawing illustrating the construction of a general mobile communication system.

As shown in FIG. 1, the short message service system includes: a plurality of mobile stations (MSs) 50 for transmitting and receiving a short message; a base station 300; a mobile station center 400; a short message service center 500 for receiving the short message of the MS 50 and p-t-p transmitting it to a destination MS through the MSC 400; and a cell broadcast (CB) center 600 for broadcasting supplementary service information (weather information, traffic information and stock information, etc.) provided from each cell broadcast entity (CBE) 700 to an area where a service subscriber is located.

The CBE 700 is a sort of a server providing supplementary service information.

FIG. 2 is block diagram of a mobile communication terminal in accordance with a conventional art.

As shown in FIG. 2, the MS 50 includes: a key input unit 110 for generating a message data according to a key value inputted through a key pad; a controller 120 for converting the generated data according to a short message transmission protocol and generating a data burst message; and a radio module 150 for processing the generated data burst message so as to be wirelessly transmitted and transmitting it to the base station 300.

A short message transmitting process will now be described with reference to FIGS. 1 and 2.

When the user of the MS 50 depresses the key pad, the key input unit 100 generates a message data according to an inputted key value.

When the message data is generated, the controller 120 generates a transport layer message.

As the transport layer message is generated, the controller 120 generates a data burst message according to a GSM 04.1 and carries the transport layer message in the information field of the data burst message.

The radio module 150 processes the data burst message so as to be wirelessly transmitted and transmits it to the base station 300.

After being transmitted to the base station 300, the data burst message is transmitted to the SMS center 500 through the MSC 400.

Upon receiving the data burst message from the MSC 400, the SMS center 500 stores the received message in a memory and checks a destination address field of the data burst message. And then, the SMS center 500 checks whether a destination MS is in a receiving available state and transmits the data burst message to a corresponding MS.

FIG. 3 is an SMS protocol stack.

The SMS protocol stack is defined by a global system for mobile communications (referred to as 'GSM', hereinafter) standard (GSM 03.4), and as shown in FIG. 3, the SMS protocol stack should be implemented in each of the MS 50, the MSC 400 and the SMS center 500. Basically, the SMS protocol stack is a principle protocol between the MS 50 and the SMS center 500.

Functions for the SMS are implemented in the MS 50 and the SMS center 500, and the MSC 400 handles a relay function therebetween. By means of the relay function, an SMS message is transmitted to a base station that currently handles a service even in a hand-off situation or the like.

Each layer of the SMS protocol stack will now be described with respect to the operation of the MS 50.

First, the user inputs a message desired to be transmitted. Then, in an application layer, the inputted message is put together with various parameter values according to the type of message and transmitted to a transport layer.

In the transport layer, information on 'to where the inputted message is to be transmitted' or 'whether a response is necessary' is added to the message of the application layer to thereby generate a transport layer message.

The transport layer message is transmitted to a relay layer and carried on the data burst message of the GSM standard (GSM 04.1) in the relay layer.

The data burst message is transmitted to the base station according to a call processing routine defined in the GSM standard (GSM 04.1).

One of messages defined in the GSM 04.1, the data burst message is generated in the relay layer and a sort of container transmitting the SMS message (or a CB message). That is, it signifies an SMS message (or a CB message) created according to the GSM 03.4 (SMS standard) is carried on the data burst message defined by the GMS standard (GSM 04.1) and transmitted.

As shown in FIG. 1, the conventional cell broadcasting service system includes: a plurality of mobile stations (MSs) 50 for transmitting and receiving a short message; a base station 300; a mobile station center (MSC) 300; and a cell broadcast (CB) center 600 for broadcasting supplementary service information (weather information, traffic information, stock information, and the like) provided through the MSC 400 by each cell broadcast entity (CBE) 700 to an area where a service subscriber is located.

The CBE 700 is a sort of a server providing supplementary service information.

In order to do information providing business for subscribers, each supplementary service provider is allocated a cell broadcast identifier (CB ID) by a mobile communication provider, and a CB ID of a corresponding supplementary service provider is also stored in the service subscriber's terminal.

A general cell broadcasting service (CBS) process will now be described.

The CBE 700 generates a CB message in which supplementary information (i.e., weather information, etc), a CB ID value, broadcast range value, and the like, are stored.

And then, when the CBE 700 carries the generated CB message on the data burst message and transmits it to the CB center 600, the CB center 600 transmits the data burst message to a base station where the weather information service subscriber is located through the MSC 400.

Then, the base station broadcasts the data burst message to a plurality of unspecified MSs within the service area.

Each MS 50 determines whether to receive the message by referring to the CB ID of the broadcast message. That is, the MS 50 compares the CB ID of the broadcast message with its own CB ID, and if the two CB IDs are the same to each other, the MS receives the message.

In case of an MS that has not been subscribed for the weather information, it discards the broadcast message. If, however, an MS that has been subscribed for the weather information service, it receives the message.

As mentioned above, the SMS is a bidirectional transfer system while the CBS is a unidirectional transfer (from a provider to a subscriber) system.

Thus, the conventional cell broadcasting service (CBS) is of a passive transmission form that the subscriber is provided with information by the supplementary service provider, and since it is mostly provided for pay, it is less favored by subscribers. Also, at the side of the mobile communication providers, they are to be satisfied by a low business productivity.

The above references are incorporated by reference herein where appropriate for appropriate teachings of additional or alternative details, features and/or technical background.

SUMMARY OF THE INVENTION

Therefore, an object of the present invention is to provide a cell broadcasting service system and method that are capable of broadcasting and transmitting a short message that a general subscriber of a mobile communication generates.

Another object of the present invention is to provide a cell broadcasting service system and method that are capable of providing area information or information of a small circles to corresponding area residents or members at a low cost.

To achieve at least the above objects in whole or in parts, there is provided a cell broadcasting service system including: an MS 100 for generating an SMS type message and a CBS type message; an SMS center 550 for transmitting a CBS type message to a CB center 650 when receiving it from the MS 100; and the CB center 650 for broadcasting a received message to a corresponding range area by referring to broadcast range information of the message when receiving the message from the SMS center 550.

In the cell broadcasting service system of the present invention, an interface 800 between the SMS center 550 and the CB center 650 is the same as the interface between the CB center 650 and the CB entity 700.

In the cell broadcasting service system of the present invention, the MS 100 includes: a key input unit 110 for generating a message data according to an inputted key value through a key pad; a controller 120 for generating a data burst message according to a processing routine of a determined transfer method when the transfer method is determined for the generated data; a CB message converter 140 for converting a form of a certain message carried on the data burst message into a CBS type, if the determined transfer method is a 'broadcast'; and a radio module 150 for processing the generated data burst message so as to be wirelessly transmitted and transmitting it to a base station 300.

To achieve at least these advantages in whole or in parts, there is further provided a cell broadcasting service method including the steps of: generating a message (S1~S10); transmitting the generated message to an SMS center 550 through a base station 300 and an MSC 400; transmitting a CBS type message of the messages transmitted to the SMS center 550, to a CB center 650; and checking a broadcast range of the message transmitted to the CB center 650 and broadcasting it to a corresponding range area through the MSC 400.

In the cell broadcasting service method of the present invention, the message generating step (S1~S10) includes the steps of: inputting a message content to a terminal (S1); storing the inputted message in a memory (S2); determining a message transfer method (S3); inputting a CB ID and caller information and selecting a message broadcast range, if the determined transfer method is a 'broadcast' (S4, S6 and S7); converting the message form stored in the memory into a CBS type, if the broadcast range is selected (S8); and transmitting the converted message to a base station (S9).

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
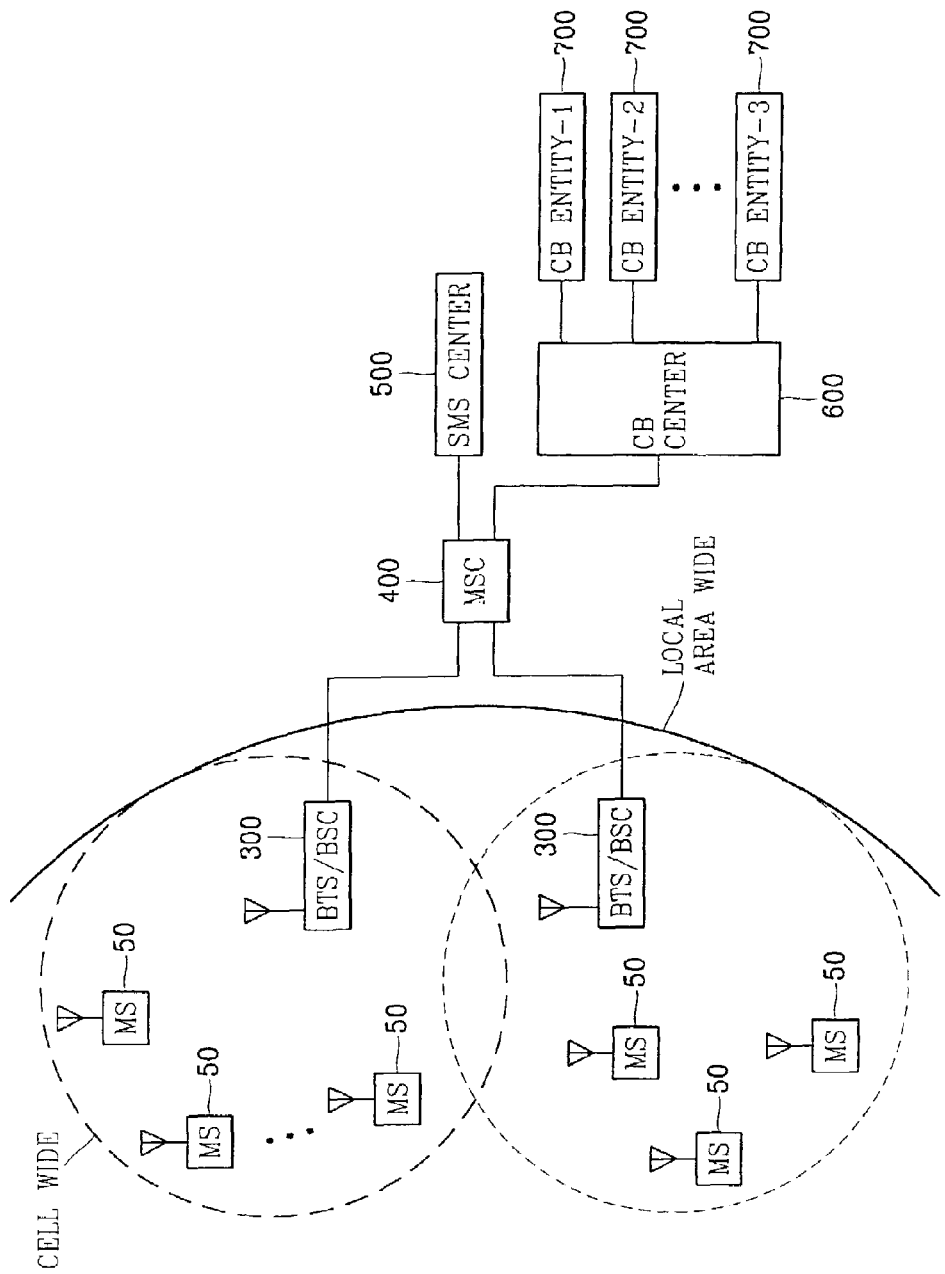
FIG. 1 is a drawing illustrating the construction of a mobile communication system in accordance with a conventional art.
Figure 2:
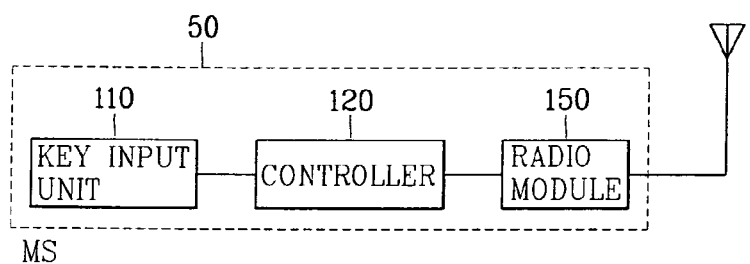
FIG. 2 is a block diagram of a mobile communication terminal in accordance with the conventional art.
Figure 3:
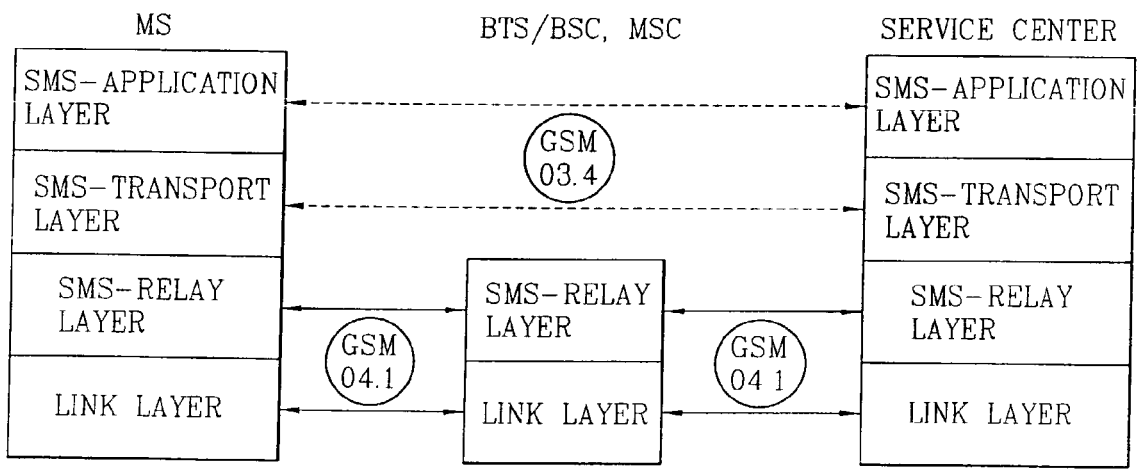
FIG. 3 is a drawing illustrating an SMS protocol stack.
Figure 4:
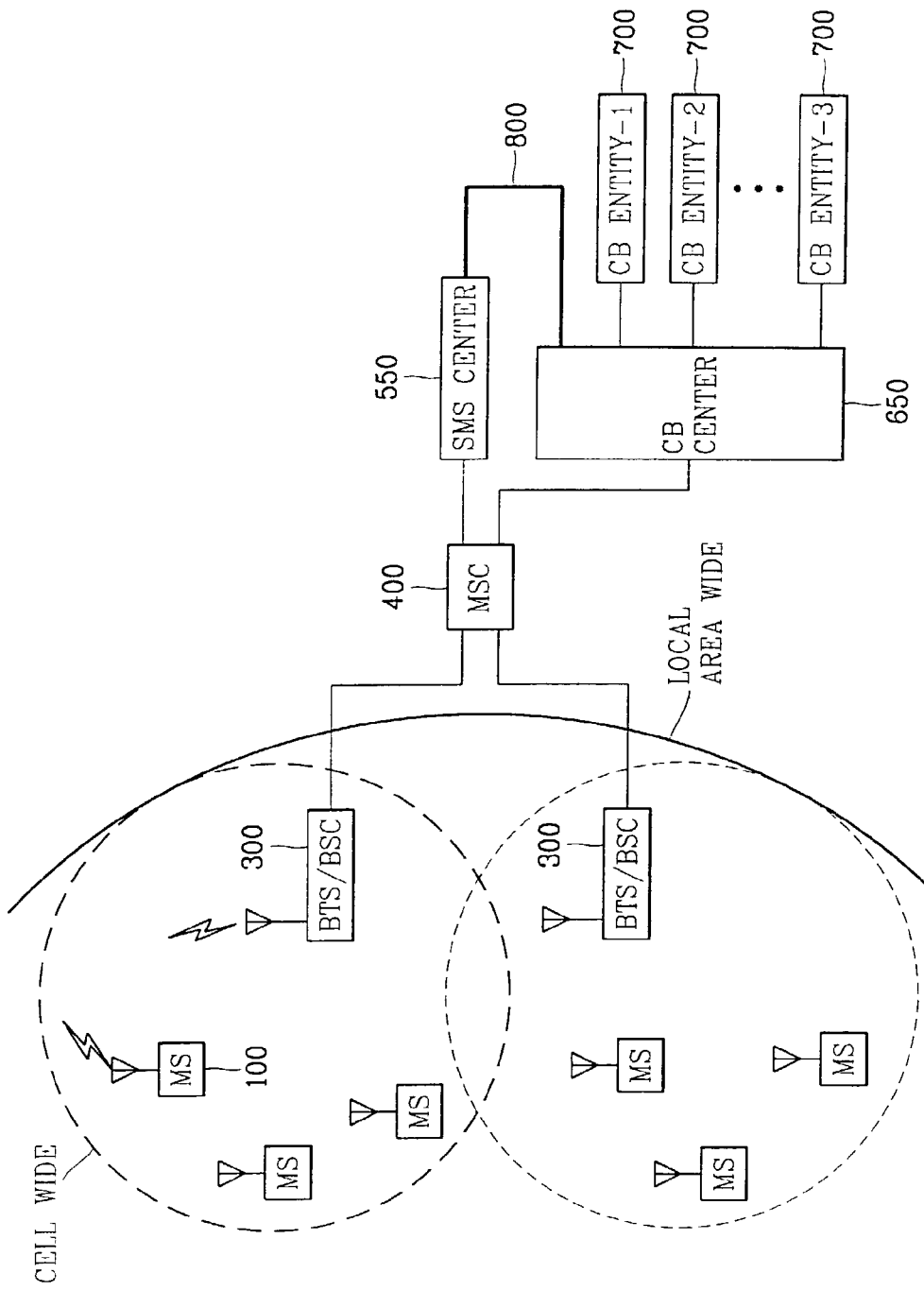
FIG. 4 is a drawing illustrating the construction of a mobile communication system in accordance with the present invention.
Figure 5:
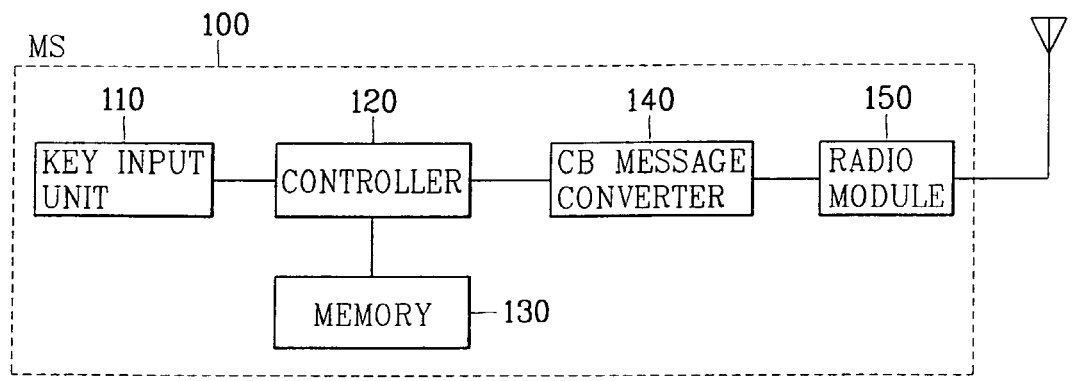
FIG. 5 is a block diagram of a mobile communication terminal in accordance with the present invention.

FIG. 4 is a drawing illustrating the construction of a mobile communication system in accordance with the present invention, and FIG. 5 is a block diagram of a mobile communication terminal in accordance with the present invention.

A cell broadcasting service system of the present invention includes: an MS 100 for generating an SMS type message and a CBS type message; and an SMS center 550 for transmitting a CBS type message to a CB center 650 when receiving the CBS type message from the MS 100; and a CB center 650 for broadcasting a received message to a corresponding range area by referring to broadcast range information of the message when receiving the message from the SMS center 550.

An interface 800 between the SMS center 550 and the CB center 650 is the same as the interface between the CB center 650 and the CB entity 700. That is, at the side of the CB center 650, the SMS center 550 is one CB entity, and the interface 800 between the CB center 650 and the SMS center 550 is set in the same manner as the interface between the CB center 650 and the CB entities (1, 2, . . . n, 700).

As shown in FIG. 5, the MS 100 includes: a key input unit 110 for generating a message data according to an inputted key value through a key pad; a controller 120 for generating a data burst message according to a processing routine of a determined transfer method when the transfer method is determined for the generated data; a CB message converter 140 for converting a form of a certain message carried on the data burst message into a CBS type, if the determined transfer method is a 'broadcast'; and a radio module 150 for processing the generated data burst message so as to be wirelessly transmitted and transmitting it to a base station 300.

Figure 6:
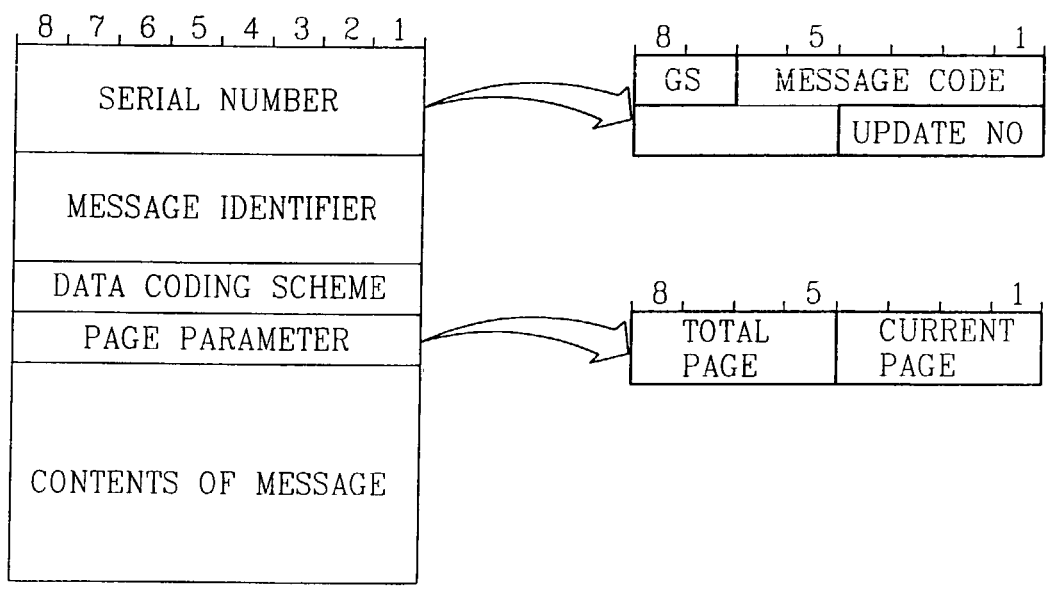
FIG. 6 is a drawing illustrating a form of a CB message.

FIG. 6 is a drawing illustrating a form of a CB message.

Generally, the CB message is generated in the CB entity 700, but the CBS system of the present invention allows a CB message to be generated even in a general MS.

As shown in FIG. 6, a CB message generated in an upper layer includes: a serial number field storing a broadcast range value of a message; a message identifier field storing a CB ID assigned from a mobile communication provider; a data coding scheme field storing a coding method of a message or information on an expression language; a page field storing total page information and current page information of the message; and a contents field storing a message content.

The serial number field includes: a geographical scope (GS) field of 2 bit size storing the message broadcast range value. A screen display mode and a transfer area range of the CB message according to each storage value of the GS field are as shown in below Table.

TABLE

| GS value | Display mode | Geographical scope |
|---|---|---|
| 00 | Immediate | Cell wide |
| 01 | Normal | PLMN wide |
| 10 | Normal | Location area wide |
| 11 | Normal | Cell wide |

If a display mode of a received message is 'immediate', the MS informs a user that a message has been received, and outputs a message content on the screen.

If the display mode is 'normal', the MS just informs the user that a message has been received, but does not output the message on the screen.

The geographical scope is classified into a cell wide broadcast, a PLMN wide broadcast, a location area wide broadcast.

If the geographical scope is 'cell wide' ('00' or '11'), a corresponding message is broadcast to a cell area where the transmission MS 100 is located.

IS If the geographical scope is 'PLMN wide' ('01'), a corresponding message is broadcast to entire network.

If the geographical scope is 'location area wide' ('10'), a corresponding message is broadcast to the cell in which the transmission MS 100 is located and a plurality of its neighboring cells.

Figure 7:
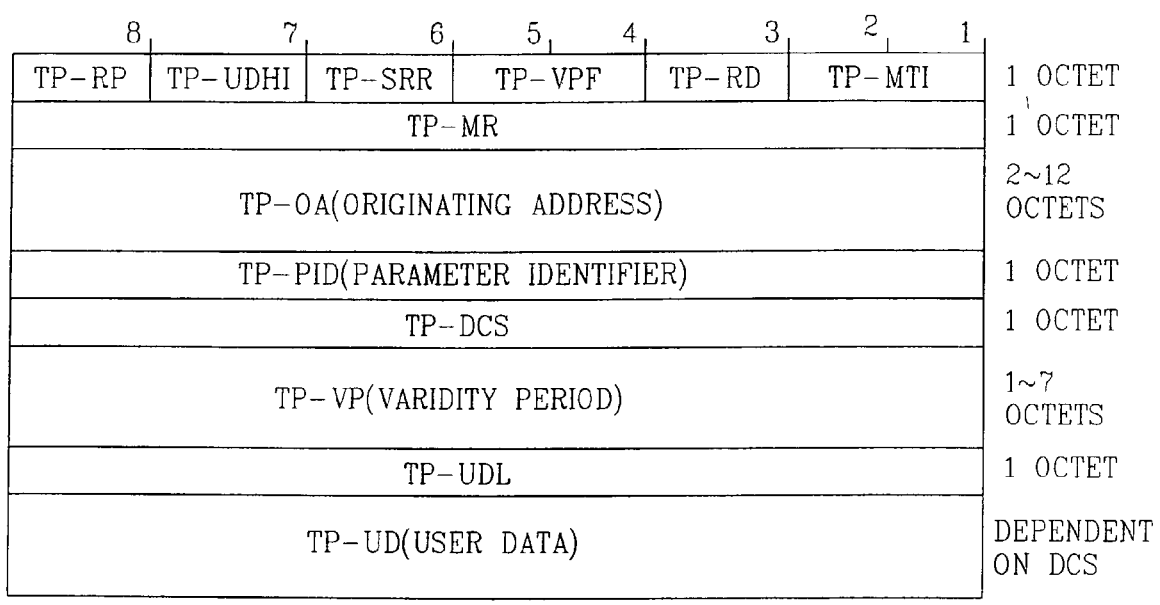
FIG. 7 is a drawing illustrating a form of a transport layer message for CBS in accordance with the present invention.

FIG. 7 is a drawing illustrating a form of a transport layer message for CBS in accordance with the present invention, which is a GMS standard.

The form of the CBS transport layer message is the same as the SMS transport layer message, except that some field values of a message are differently set, so that a general MS can have a CBS origination function (mobile originated CBS).

As shown in FIG. 7, the transport layer message is constructed with a plurality of fields including an originating address (OA) field, a parameter identifier (PID) field, a validity period (VP) field and a user data (UD) field.

The OA field stores an address of the transmission MS 100 and is required for an authentication of the transmission MS 100.

That is, when the CB message is transmitted to the SMS center 550 after passing the BTS/BSC 300 and the MSC 400, the SMS center 550 checks whether a user of the transmission MS 100 is a subscriber (or a small circles' manager) who has been assigned a CB ID by referring to the OA field of the transport layer message.

The PID field is a value indicating a type of a message. By checking the PID value, the SMS center 550 can identify whether a corresponding message is a short message or a CB message.

The VP field is a repetition transmission time limit value. Since the cell broadcasting transmits a data simultaneously one time through a paging channel, the transmission is not reliable.

In order to overcome the problem of the unreliability, after the transmitting party of the CB message transmits the CB message, it repeatedly transmits the same message for a certain period of time. The transmitting party repeatedly transmits the CB message for a time defined in the VP field.

The user data (UD) field includes a CB message generated from the upper layer and a destination address (DA), and an address of the CB center 650 is inputted to the destination address field.

Figure 8:
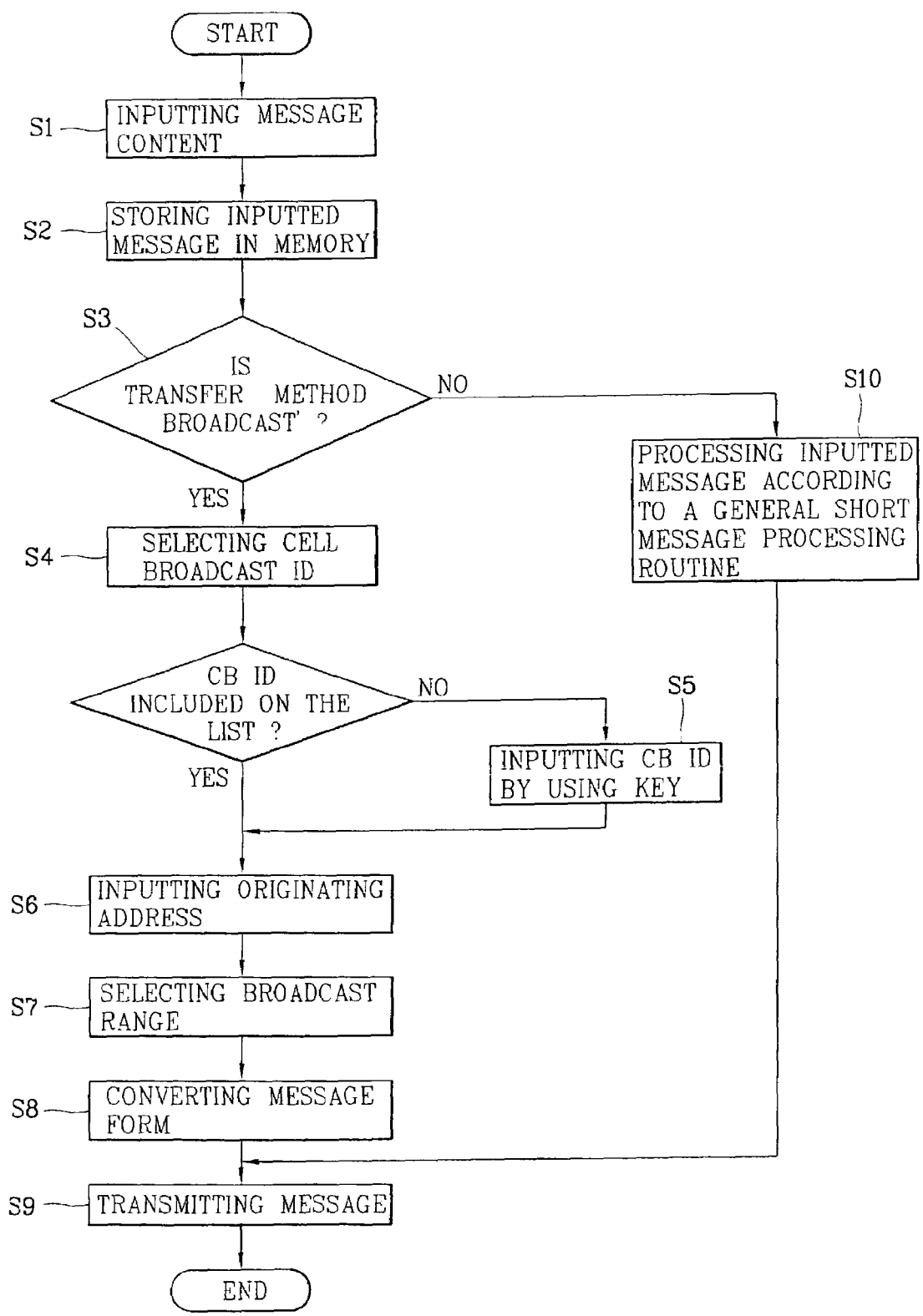
FIG. 8 is a flow chart of transmitting a broadcast type message in accordance with the present invention.

FIG. 8 is a flow chart of transmitting a broadcast type message in accordance with the present invention.

As shown in FIG. 8, a cell broadcasting service method of the present invention includes the steps of: generating a message (S1~S10); transmitting the generated message to an SMS center 550 through a base station 300 and an MSC 400; transmitting a CBS type message of the messages transmitted to the SMS center 550, to a CB center; and checking a broadcast range of the message transmitted to the CB center 650 and broadcasting it to a corresponding range area through the MSC 400.

In the cell broadcasting service method of the present invention, the message generating step (S1~S10) includes the steps of: inputting a message content to an MS (S1); storing the inputted message in a memory (S2); determining a message transfer method (S3); inputting a CB ID and caller information and selecting a message broadcast range, if the determined transfer method is a 'broadcast' (S4, S6 and S7); converting the message form stored in the memory into a CBS type, if the broadcast range is selected (S8); and transmitting the converted message to a base station 300 (S9).

The cell broadcasting service process will now be described with reference to FIGS. 4, 5 and 8.

For descriptions, it is assumed that there are small circles that desires to broadcast the items of official announcement or specific information to members and a user of the MS 100 is a manager of the small circles.

When the user of the MS 100 requests a CB ID allocation for the small circles from a mobile communication provider, the mobile communication provider assigns an area, as a CB ID, that is not used among tele-service areas allocated for the CBS, to the small circles and registers the address of the MS 100 in the SMS center 550.

And, in the same method for setting the CB ID in the MS of a supplementary service subscriber, the assigned CB ID is set in the MS of the members of the small circles.

When desired to broadcast a message related to a regular meeting to the members of the small circles, the user of the MS 100 inputs regular meeting information through the key pad (step S1). Then, the key input unit 100 generates a message data according to the inputted key value.

The controller 120 stores the generated message data in the memory 130 (step S2) and asks the user about a message transmission method (step S3). That is, the controller 120 asks the user whether to transmit as a 'general transmission (point-to-point transmission)' or as a 'broadcast'.

In case of taking the message transmission method as the 'broadcast', the controller 120 displays registered CB IDs in a liquid crystal display unit, and the user selects his/her own CB ID among the displayed CB IDs (step S4).

If the user's CB ID has not been registered in the terminal, the user inputs a corresponding CB ID through the key pad 110 (step S5).

When the CB ID is selected, the controller 120 requests the user to input an originating address and to select a message broadcast range (the cell wide, the local area wide and the PLMN wide) (step S7).

When the values in each step (S3, S4, S6 and S7) are determined, the CB message converter 140 generates a CB message by referring to the determined values and the message data stored in the memory. The generated CB message has such a structure as shown in FIG. 6.

When the CB message is generated, the controller 120 generates a transport layer message, and the CB message converter 140 converts the form of the generated transport layer message into a CBS transport layer message form (step S8).

As mentioned above, the form of the CBS transport layer message is the same as the SMS transport layer message, except that some field values (OA field, PID field, VP field, UD field) of the SMS transport layer message are converted for the cell broadcasting service. The CB message is carried on the UD field of the CBS transport layer message.

After the conversion of the message form (step S8), the controller 120 generates a data burst message with a destination address field storing the address of the SMS center 550 and an information field storing the CBS transport layer message.

The radio module 150 processes the generated data burst message so as to be wirelessly transmitted and transmits it to the base station 300. The data burst message is transmitted again from the base station 300 to the SMS center 550 through the MSC 400.

When the data burst message is received, the SMS center 550 first stores the received data burst message in the memory and then checks a PID field of the received message in order to identify a type of the message.

If the received message has the CBS type, the SMS center 550 checks the originating address field of the received message for authentication of the transmission MS. That is, the SMS center 550 checks whether the transmission MS 100 has been registered for the cell broadcasting service.

If the transmission MS 100 has been registered, the SMS center 550 checks the destination address value of the transport layer message carried on the data burst message and transmits the data burst message to a corresponding CB center. The destination address value is carried in the user data field of the transport layer message.

In the CBS system of the present invention, the CB center 650 recognizes the SMS center 550 as one of the CB entities 700, so that the CB center 650 processes the data burst message received from the SMS center 550 according the general CBS process.

In the step S3, in case of taking the message transmission method as the 'general transmission (point-to-point transmission)', the controller 120 processes the generated message data according to a general short message processing routine (step S10). That is, in the step S3, in the case of adopting the general transmission (point-to-point transmission), the short message processing and transmitting processes are the same as in the conventional art.

As stated above, a Conversion module such as the CB message converter 140 is installed in the transmission MS 100, but it may be installed in the SMS center 550 or in the CB center 650. If the Conversion module is installed in the SMS center 550, the step S8 is performed in the SMS center 550 as follows.

When the data burst message is received from the MSC 400, the SMS center 550 checks a PID field of the received message to identify whether the received message has the SMS type message or the CBS type message.

If the received message is the CBS type message, the SMS center 550 performs an authentication process on the transmission MS, and converts the form of the received message into the CBS type message form by referring to a destination address, the message content, and a broadcast range. And then, the SMS center 550 transmits the converted message to the CB center 650.

As so far described, the cell broadcasting service system of the present invention has the following advantages.

That is, by assigning a CB ID to a specific subscriber group (a small circles or a local group), a general subscriber can broadcast a short message in the position of the CB entity 700.

In addition, various get-together information and local information can be easily provided to subscribers of a group located within a broadcast range, and more efficient and substantial information can be provided at a low cost.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A cell broadcasting service system comprising:
    a mobile communication terminal for generating a message and for inserting a cell broadcasting (CB) identification (ID) and a geographical scope information to the generated message, the terminal including a message converter for converting the generated message including the CB ID and the geographical scope information into a cell broadcast service (CBS) type message that includes the CB ID in an identifier field and the geographical scope information in a geographical scope field that is different and separate from the identifier field;

a short message service (SMS) center for transmitting the CBS type message to a CB center when receiving the CBS type message from the terminal; and the CB center for broadcasting a received message to terminals assigned the CB ID in the geographical scope information by referring to the geographical scope field of the CBS type message when receiving the CBS type message from the SMS center, wherein the geographical scope field indicates a geographical scope to broadcast the CBS type message and that indicates a message display mode to be performed at a receiving terminal upon receiving the CBS type message.

2. The system of claim 1, wherein the CB center is connected to the SMS center by an interface of a same type as an interface with a CB entity.

3. The system of claim 1, wherein the terminal comprises:
a controller for generating a data burst message according to a determined processing routine after a message data is generated by a key input unit and the transmission method of the generated data is determined;
the CB message converter for converting a form of a certain message carried on the data burst message into the CBS type message; and
a radio module for processing the CBS type message so as to be wirelessly transmitted and transmitting the processed CBS type message to a base station.

4. The system of claim 1, wherein the terminal registers its address in the SMS center for a CBS authentication.

5. The system of claim 1, wherein the geographical scope includes one of a cell wide scope to broadcast to a cell area where the mobile communication terminal is located, a location area wide scope to broadcast to a cell where the mobile communication terminal is located and to a plurality of neighboring cells and a network wide scope to broadcast to an entire network.

6. A cell broadcasting service method comprising:
generating a message including a cell broadcast (CB) identification (ID) and a geographical scope information at a mobile communication terminal;
converting the message in the mobile communication terminal into a cell broadcast service (CBS) type message that includes the CB ID in a first field and the geographical scope information in a second field that is separate from the first field;
transmitting the converted message from the mobile communication terminal to a CB center;
checking a broadcast range of the message transmitted to the CB center by reading the geographical scop information of the converted message, wherein the second field is a 2 bit field that indicates the broadcast range for broadcasting the CBS type message and a message display mode to be performed by a terminal upon receiving the CBS type message; and
broadcasting the converted message to terminals in a corresponding range area.

7. The method of claim 6, wherein generating the message at the mobile communication terminal includes:
inputting a message content to the mobile communication terminal;
storing the inputted message in a memory;
determining a message transfer method; and
inputting the CB ID and caller information and selecting a message broadcast range, wherein the converting includes converting the message form stored in the memory into the CBS type if the broadcast range is selected; and wherein the transmitting includes transmitting the converted message to a base station.

8. The method of claim 6, wherein the broadcast range is classified into a cell wide to broadcast to a cell area where the mobile communication terminal is located, a location area wide to broadcast to a cell where the mobile communication terminal is located and to a plurality of neighboring cells and a network wide to broadcast to an entire network.

9. The method of claim 6, wherein the terminal is assigned the CB ID.

10. The method of claim 7, further comprising registering the mobile communication terminal's address in a short message service (SMS) center for CBS authentication.

11. The method of claim 6, wherein a CB center is connected to a short message service (SMS) center by an interface of a same type as the interface with a CB entity.

12. A cell broadcasting service system comprising:
a transmitting mobile terminal configured to input a cell broadcasting service (CBS) message and to input a broadcast range that the CBS message is to be broadcasted to; and
a receiving terminal configured to receive the broadcasted CBS message and to immediately display the CBS message upon receipt of the broadcasted CBS message when the broadcast range of the CBS message indicates the CBS message is to be immediately displayed and the receiving terminal to avoid immediately displaying the CBS message when the broadcast range of the CBS message indicates the CBS message is not to be immediately displayed, wherein the broadcasting range is provided in a 2 bit field that indicates the broadcast rand of the CBS message and that indicates a display mode of the receiving terminal for displaying the received CBS message.

13. The system of claim 12, wherein the receiving terminal informs a user of the receiving terminal that the CBS message has been received but does not immediately display the CBS message when the broadcast range indicates that the CBS message is to display in a normal mode.

14. The system of claim 12, wherein the transmitting mobile terminal is configured to input a short message service (SMS) message and to transmit the SMS message.

15. The system of claim 14, further comprising:
an SMS center for controlling the transmission of the SMS message;
a cell broadcast (CB) center for controlling the broadcasting of the CBS message; and
an interface connecting the SMS center and the CB center such that when the transmitting mobile terminal inputs the CBS message, the transmitting mobile terminal transmits the CBS message to the SMS center, the SMS center transmits the CBS message to the CB center via the interface, and the CB center then controls the broadcasting of the CBS message.

16. The system of claim 1, wherein the geographical scope field comprises a 2 bit field.

17. The method of claim 6, wherein the geographical scope information comprises a geographical scope range.

18. The system of claim 1, wherein the message converter converts the generated message into the CBS type message if a broadcast range is selected.

19. The method of claim 6, wherein the message is converted into the CBS type message if a broadcast range is selected.

20. The system of claim 1, wherein the message display mode comprises one of "immediate" or "normal," wherein "immediate" relates to informing a user of the receiving terminal that a message has been received and immediately displaying the message on a screen of the receiving terminal, and "normal" relates to informing the user of the receiving terminal that the message has been received without immediately displaying the message on the screen of the receiving terminal.

21. The method of claim 6, wherein the message display mode comprises one of "immediate" or "normal," wherein "immediate" relates to informing a user of the receiving terminal that a message has been received and displaying the message on a screen of the receiving terminal that a message has been received and displaying the message on a screen of the receiving terminal, and "normal" relates to informing the user of the receiving terminal that the message has been received without immediately displaying the message on the screen of the receiving terminal.

* * * * *